United States Patent Office 2,903,893
Patented Sept. 15, 1959

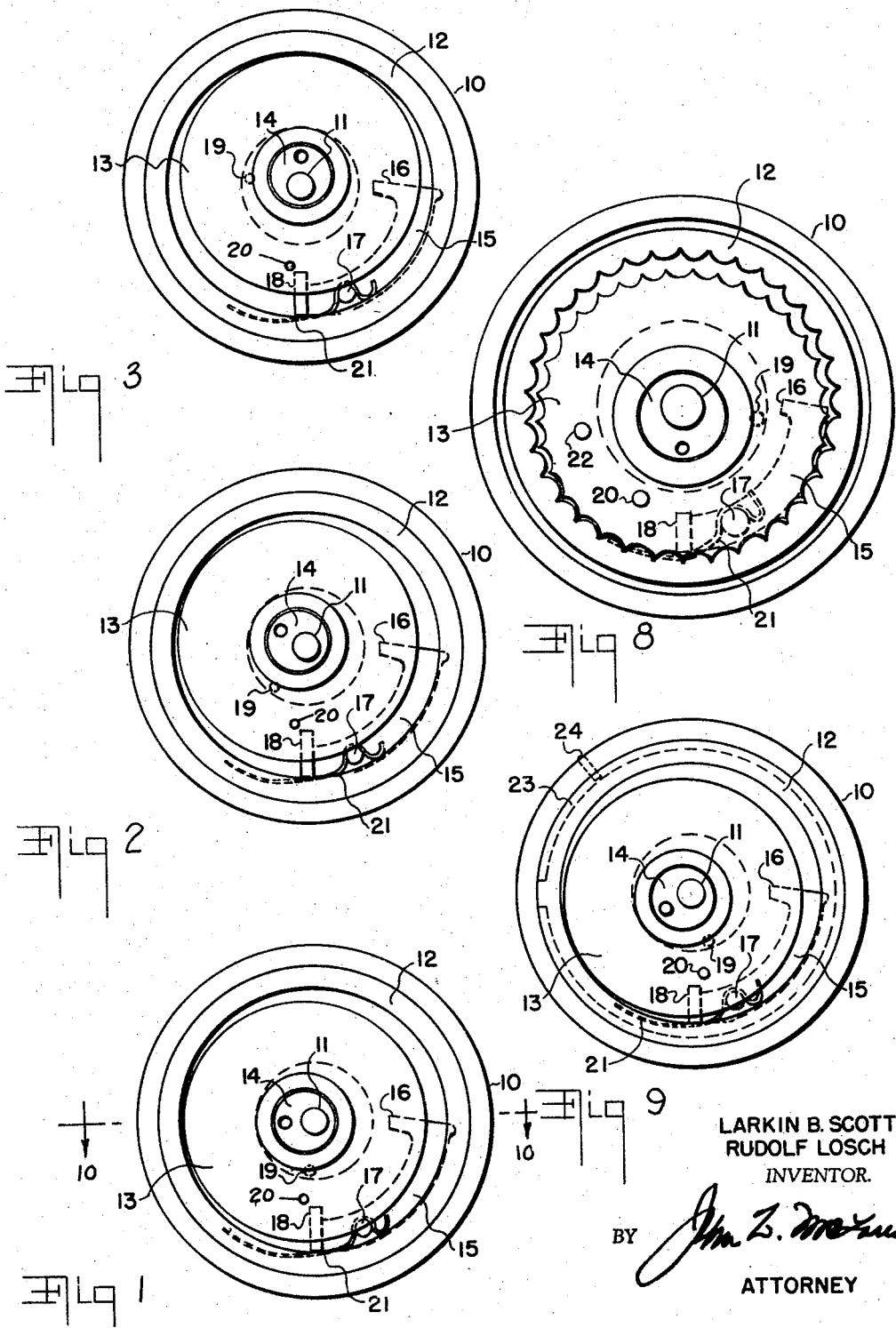

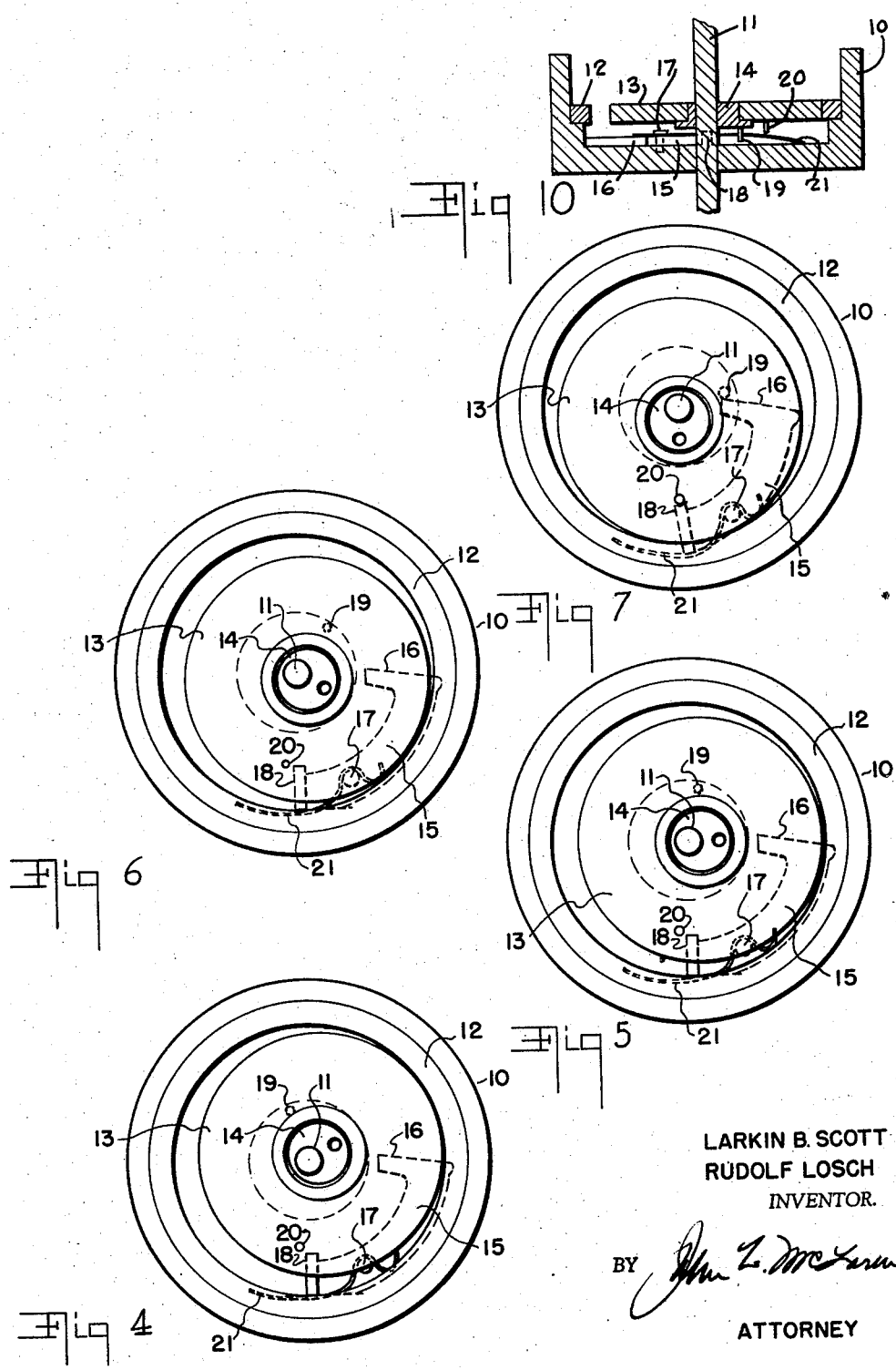

2,903,893

LIMIT STOP MECHANISM

Larkin B. Scott, Fort Worth, Tex., and Rudolf Losch, Fairfield, Conn., assignors to The Perkin-Elmer Corporation, Norwalk, Conn., a corporation of New York Application March 31, 1958, Serial No. 725,081

9 Claims. (Cl. 74—10.2)

The present invention is concerned with a limit stop mechanism and, more particularly, is intended and designed to operate with a rotary device having a rotatable central shaft and at least two other members, one of which is moved in a hypocycloidal motion relative to the other in response to rotation of the central shaft. The device of the present invention is small, compact, and has a reliable positive action as well as being inexpensive and convenient to manufacture.

The present invention has highly desirable features of operation not to be found in prior art devices. The stacked washer type of limit stop is typical of known mechanisms in common use. Such an arrangement usually comprises a plurality of washers mounted axially on the rotatable shaft in stacked arrangement. Each of the washers has an ear which is shaped to engage the ear on an adjacent washer. On one end of the stack, a washer is engaged by the shaft by reason of its ear striking a pin appropriately positioned on the rotatable shaft. The end washer then becomes fixed in relation to the rotatable shaft so that, as the shaft is rotated through a complete revolution, the end washer is also rotated and comes in contact with the ear of its adjacent washer.

Similarly, after substantially one complete revolution, the second washer engages the ear of the third washer, etc., until all the washers on the shaft are aligned and engaged. The washer on the other end of the stack engages a pin which is fixed with respect to the rotatable shaft. When such engagement takes place, the shaft can no longer be rotated in that direction.

The shaft can, however, be rotated in the opposite direction and substantially the same operation takes place, the pin on the rotatable shaft being turned through a full revolution before it picks up the ear of the first washer. After engagement of the shaft pin with the ear of the first washer, that washer rotates with the shaft and, after completing one revolution, picks up the second washer by engagement with its ear. This operation continues until the ear of the last washer strikes the pin which is disposed in fixed relation with respect to the rotatable shaft.

Though in common use, the stacked washer type of limit stop mechanism has the deficiencies of comprising a relatively large number of movable parts and also of occupying considerably more space than the device of the present invention when applied to certain types of apparatus.

As is known to those skilled in the art, the stacked washer type of limit stop requires at least one washer for each desired revolution of the rotary device between limits. Thus, in a 30-turn device, thirty or more washers will be required; because of the ear on the washers, each washer rotates somewhat less than a full revolution before engaging the adjacent washer. The amount of rotary movement lost depends on the angle subtended by the ear of the washer. In most cases, this is of the order of five to ten degrees. Therefore, as much as three hundred degrees, or virtually one full revolution, may be lost in a 30-turn rotary device employing a stacked washer limit stop mechanism. Moreover, in such a device the comparatively large number of separate movable parts greatly increases and multiplies the probability of failure of the mechanism to operate properly.

The primary object of the present invention is to obviate the deficiencies of prior art devices.

An ancillary object of the present invention is to provide a limit stop mechanism which has positive action, is compact, strong and is easy to manufacture and assemble.

Another object of the present invention is to provide a limit stop mechanism having a wide variety of selectable limits within which it may be made to operate.

Other features and advantages of the present invention will be better understood from the explanation of the operation of several typical embodiments as illustrated in the drawings, in which Figs. 1 through 7 illustrate step-by-step a typical embodiment of the present invention;

Fig. 8 is an illustration of another embodiment of the present invention;

Fig. 9 is an illustration of the present invention embodied in an apparatus of a slightly different configuration, and Fig. 10 is a cross-sectional plan through the line 10—10 of Fig. 1 but with the center elements rotated to more clearly show pins 19 and 20.

As previously mentioned, the present invention is especially designed and adapted to operate in conjunction with a particular kind of rotary device in which an eccentric means rotated on a central shaft imparts hypocycloidal motion to one member relative to another member with which it is engaged. One form of such a rotary device is a high precision electrical transducer as disclosed in U.S. Patent 2,843,822 wherein an outer gear having internal teeth is described as being in engagement with an inner gear of smaller diameter but having teeth of the same diametral pitch. In that copending application, the internal gear has one less tooth than the outer gear. The rotation of a central shaft having an eccentric portion operatively engaging the inner gear imparts a hypocycloidal motion to the inner gear so that the inner gear successively engages the teeth of the outer gear revolving with a nutating motion and rotating in a direction opposite to that of the central shaft.

The same operative relationship can be implemented by other than gear means and in the interests of simplicity and clarity Figs. 1 through 7 illustrate a friction drive means. As is illustrated in Fig. 1, a body member 10 supports a coaxial central shaft 11 which is adapted to be rotatable. A first member 12 is coaxially positioned with respect to the central shaft 11 and a second member 13 is positioned to engage the first member 12. The central shaft 11 has an eccentric portion 14 which is in bearing contact with the second member 13 and is free to rotate therein. Rotation of the central shaft 11 therefore imparts a hypocycloidal motion to the second member 13 relative to the first member 12 which, in this particular embodiment, is fixed in body member 10. The limit stop mechanism operates to control the maximum rotation of the device and comprises a lever and at least two coacting pins. The lever 15 includes a first lever arm 16 and a second lever arm 18 and is pivotally mounted on the body member 10. The first lever arm 16 of the lever 15 is movable about a pivot 17 so that it may be displaced radially with respect to the axis of the device, i.e., the central shaft 11.

Similarly, the second lever arm 18 is movable about the lever pivot 17. Spring 21 is a length of spring wire having one end contacting the inner wall of body member 10 and the other fixed on pivot 17 thereby asserting inward radial force on second lever arm 18.

The central shaft 11 has affixed to it a pin 19 which rotates coaxially therewith. A second pin 20 is fixedly mounted in the second member 13 which has a hypocycloidal motion. Successive stages of operation of the device through one complete rotation of central shaft 11 are illustrated in the sequence of drawings Figs. 1 through 7.

Fig. 2 shows the central shaft 11 rotated approximately forty-five degrees in a clockwise direction from the position illustrated in Fig. 1. Similarly, Figs. 3 through 7 illustrate further rotation of the central shaft 11 by approximately forty-five degrees each in a clockwise direction. It will be noted that, due to the change in disposition of the eccentric means 14, the second member 13 is moved in a constantly changing engagement with the first member 12. Such engagement (which may be frictional as illustrated in Figs. 1 through 8) proceeds in the same direction as the rotation of the central shaft 11, i.e., clockwise in the illustrations. The second member 13, which has a hypocycloidal motion as a result of being driven by the eccentric means 14, does not rotate in the same direction as the central shaft 11, however.

In the particular case illustrated, the second member 13 proceeds slowly in substantially a counterclockwise direction. The movement of second member 13 is accomplished by a nutating motion by reason of which any point on the second element 13 will have an oscillating radial movement with respect to central shaft 11 combined with a rotational movement about the axis of central shaft 11. The counterclockwise motion of the second member 13 in response to continued rotation of shaft 11 brings the pin 20 into alignment with the second lever arm 18.

During the succeeding revolution of central shaft 11, the nutating motion of second member 13 and of the pin 20 (which is fixed in relation to the second member 13) depresses the second lever arm 18 to rotate the lever 15 in a counterclockwise direction about its pivot 17, displacing the first lever arm 16 toward the central shaft 11 as shown in Fig. 7. As the rotation of the central shaft 11 proceeds, the coaxial rotation of the pin 19 brings it in engagement with the first lever arm 16, thereby stopping further rotation of the device in a clockwise direction.

The device may, however, be rotated in an opposite direction. Upon counterclockwise rotation of the central shaft 11, the pin 20 is moved out of contact with the second lever arm 18 so that the lever 15 moves in a clockwise direction in response to the urging of the resilient member such as the spring 21. With the first lever arm 16 returned to its initial position, pin 19 is free to rotate and the device may be rotated in a counter-clockwise direction until the pin 20 has made a full revolution in hypocycloidal motion in a clockwise direction. When the pin 20 is once again aligned with the second lever arm 18, the nutating motion of the second member 13 will displace the second lever arm 18 away from the central shaft 11. The first lever arm is correspondingly moved toward the central shaft 11, preventing further rotation of the device when engaging pin 19 in its rotary motion about the central shaft 11.

In the particular embodiment illustrated in Figs. 1 through 7, the lever 15, including two lever arms 16 and 18, encompasses approximately a 90-degree sector of the rotary device. It will also be noted that the pin 19 is disposed at approximately 90 degrees with respect to the high point of the eccentric means 14. The angular sectors need not be 90 degrees but the relationships described should be substantially consistent. That is to say that the angular displacement of the pin 19 from the high point of the eccentric means 14 should subtend substantially the same angle as that encompassed by the extremes of the lever 15. Therefore, if the lever spans an angular sector of 60 degrees of the rotary device, the pin 19 should be disposed approximately 60 degrees from the high point of the eccentric means 14.

In accordance with the concept of the present invention, a third pin 22 may be employed as shown in Fig. 8. The operation of this particular embodiment is substantially the same as that previously described but the use of the third pin 22 affords a means of selectively determining the number of rotations which may be completed by the central shaft 11 before the limit stop mechanism prevents further rotation. By displacing the pin 22 ninety degrees from the pin 20, the number of revolutions which the device completes to actuate the stop mechanism will be reduced by approximately one quarter, i.e., if the device is ordinarily a 20-revolution unit, a third pin disposed approximately 90 degrees from the second pin, converts the device to a 15-revolution device. It will, of course, be understood that the angle of revolution of the last turn is diminished by the width of lever arm 16. Thus, the third pin 22 affords the means of selectively reducing the maximum number of revolutions of the device.

It will be obvious to those skilled in the art that alternatively a bar-like means spanning a particular angular sector as desired and generally disposed along a chord on a circle concentric with the central shaft 11 will perform the same function as second and third pins.

The internal-external gear arrangement of the rotary device disclosed in U.S. Patent 2,843,822 is a typical example of how the present invention may be advantageously employed. Assuming that the outer gear has thirty-four internal teeth and the inner gear has thirty-three teeth, as shown in Fig. 9, the device will normally be capable of completing thirty-three revolutions between the points where the limit stop is actuated. In accordance with the concept of a variant embodiment of the present invention, however, the number of revolutions which such a rotary device is capable of completing between its limit points may be increased by any desired number up to twice its normal capabilities. Fig. 9 illustrates such an embodiment of the present invention. The first member, such as the outer gear having internal teeth, is indicated at 12. In this particular version of the present invention, the first member 12 is not fixed in relation to the body member 10 but is rather disposed therein in a sliding fit so that it is free to move rotationally with respect to the body member 10. A groove 23 is cut into the edge of the first member 12 and a pin 24 fixed in the body member 10 is slidably positioned in the groove 23. The groove 23 may extend along the periphery of the first member 12 so as to encompass an angle equal to that subtended by one less than the total number of teeth in the outer gear. In such an embodiment of the present invention, if the outer gear 12 has thirty-four teeth and the inner gear has thirty-three teeth as shown in Fig. 8, it is capable of about sixty-five full revolutions between the limit points of its full range.

In operation, the embodiment of Fig. 9 having the same number of teeth as the device of Fig. 8 will function for the first thirty-three revolutions of the central shaft 11 in a manner identical to that of the embodiment illustrated in Figs. 1 through 7. Near the completion of the thirty-third revolution of the central shaft 11, the second pin 20 comes in contact with the second lever arm 18 of the lever 15. Due to the sliding fit of gear 12 in groove 23 and the fact that inner gear 13 is unable to rotate further because of the counteracting force of spring 21, the outer gear 12 is displaced by one diametrical tooth pitch. The device is then able to complete one more revolution of the central shaft 11.

Upon completing the additional or thirty-fourth revolution, the second pin 20 again comes in contact with the second lever arm 18 rotatably displacing the outer gear 12 by an amount equal to the pitch of one tooth, enabling the central shaft to rotate through yet another revolution. The outer gear 12 may therefore be displaced thirty-three additional times, adding thirty-three additional revolutions to the range of the device. After completing the thirty-third additional revolution or a total of sixty-six revolutions, the end of the groove 23 engages with the pin 24, preventing the outer gear 12 from being rotated further. The second pin 20 therefore depresses the second lever arm 18 of the lever 15, displacing the first lever arm 16 toward the central shaft 11 and in the path of pin 19, preventing further rotation. Any desirable intermediate variation of the size of the groove 23 may be made so as to add a lesser number of additional turns to the basic capabilities of the rotary device.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

We claim:

1. A rotary device including a body member, a first member coaxially disposed with respect to a central shaft mounted in said body member, a second member engaging said first member, eccentric means rotatable with said central shaft for imparting hypocycloidal motion to one of said members relative to the other member, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin fixedly mounted on the member having said hypocycloidal motion for engaging the second arm of said lever assembly, whereby to displace the said first lever arm toward said central shaft in the path of said first pin, stopping further rotation of said central shaft.

2. A rotary device including a body member, a first outer member coaxially disposed with respect to a central shaft mounted in said body member, a second smaller member positioned within said first member in engagement therewith, eccentric means rotatable with said central shaft for imparting hypocycloidal motion to said second member, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin fixedly mounted on said second member for engaging and displacing said second lever arm away from said central shaft, whereby to position said first lever arm in the path of said first pin, stopping further rotation of said central shaft.

3. A rotary device including a body member, a first outer member coaxially disposed with respect to a central shaft mounted in said body member, a second smaller member positioned within said first member in engagement therewith, eccentric means rotatable with said central shaft for imparting hypocycloidal motion to said second member, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and second and third pins fixedly mounted on said second member for engaging and displacing said second lever arm away from said central shaft, whereby engagement of said second pin limits the rotation of said device in one direction and engagement of said third pin limits the rotation of said device in the other direction.

4. A rotary device including a body member, an outer gear coaxially disposed with respect to a central shaft mounted in said body member and having internal teeth, an inner gear positioned within said outer gear and in engagement therewith, said inner gear having teeth of the same diametral pitch as those of said outer gear but less in number, eccentric means rotatable with said central shaft for imparting hypocycloidal motion to said inner gear, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said lever arm, and a second pin mounted on said inner gear for engaging and displacing said second lever arm away from said central shaft, whereby to position said first lever arm in the path of said first pin stopping further rotation of said central shaft.

5. A rotary device including a body member, an outer gear coaxially disposed with respect to a central shaft mounted in said body member and having internal teeth, an inner gear positioned within said outer gear and in engagement therewith, said inner gear having teeth of the same diametral pitch as those of the outer gear but less in number, eccentric means rotatable with said central shaft for imparting hypocycloidal motion to said inner gear, and a limit stop mechanism for controlling the maximum rotation of said device, said mechanism comprising a lever assembly pivotably mounted on said body member to encompass an angular sector of the rotation of said central shaft and disposed for substantially radial movement of first and second lever arms with respect to said central shaft, said lever assembly including a resilient member for urging said first lever arm away from said central shaft, a first pin mounted for concentric rotation with said central shaft in the plane of said first lever arm, the angular sector subtended between said first pin and the high point of said eccentric means being substantially the same as that encompassed by said lever assembly, and a second pin mounted on said inner gear for engaging and displacing said second lever arm away from said central shaft, whereby to position said first lever arm in the path of said first pin, stopping further rotation of said central shaft.

6. A rotary device including a body member, an outer gear coaxially disposed with respect to a central shaft mounted in said body member and having internal teeth, an inner gear positioned within said outer gear and in engagement therewith, said inner gear having teeth of the same diametral pitch as those of the outer gear but one less in number, eccentric means rotatable with said central shaft for imparting hypocycloidal motion to said inner gear, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin mounted on said inner gear for engaging and displacing said second lever arm away from said central shaft, whereby to position said first lever arm in the path of said first pin limiting the range of said device to a number of revolutions equal to the number of teeth in said inner gear.

7. A rotary device including a body member, an outer gear coaxially disposed with respect to a central shaft mounted in said body member and having internal teeth, an inner gear positioned within said outer gear and in engagement therewith, said inner gear having teeth of the same diametral pitch as those of the outer gear but one less in number, eccentric means rotatable with said central shaft for imparting hypocycloidal motion to said inner gear, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin mounted on said inner gear for engaging said second lever arm throughout a sector equal to an integral number of gear teeth, whereby said engagement displaces said first lever arm in the path of said first pin, limiting the range of said device to a number of revolutions equal to the number of teeth in said inner gear less the integral number of teeth spanned by said second pin sector.

8. A rotary device including a body member, an outer gear coaxially disposed with respect to a central shaft mounted in said body member and having internal teeth, said outer gear being seated in said body member for rotation relative thereto, an edge groove in the periphery of said outer gear and extending through a sector equal to an integral number of said gear teeth, a pin radially positioned in said body member to engage said groove, an inner gear positioned within said outer gear and in engagement therewith, said inner gear having teeth of the same diametral pitch as those of the outer gear but one less in number, eccentric means rotatable with said central shaft for imparting hypocycloidal motion to said inner gear, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin mounted on said inner gear for engaging and displacing said second lever arm away from said central shaft, whereby to position said first lever arm in the path of said first pin limiting the range of said device to a number of revolutions equal to the sum of the number of teeth in said inner gear and the number of teeth encompassed by said outer gear edge groove sector.

9. A rotary device including a body member, an outer gear coaxially disposed with respect to a central shaft mounted in said body member and having internal teeth, said outer gear being seated in said body member for rotation relative thereto, an edge groove in the periphery of said outer gear and extending through a sector equal to one less than the number of teeth in said outer gear, a pin radially positioned in said body member to engage said groove, an inner gear positioned within said outer gear and in engagement therewith, said inner gear having teeth of the same diametral pitch as those of the outer gear but one less in number, eccentric means rotatable with said central shaft for imparting hypocycloidal motion to said inner gear, and a limit stop mechanism for controlling the maximum rotation of said device, said mechanism comprising a lever assembly pivotably mounted on said body member for substantially radial movement of first and second lever arms with respect to said central shaft, said lever assembly including a resilient member for urging said first lever arm away from said central shaft, a first pin mounted for concentric rotation with said central shaft in the plane of said first lever arm, and a second pin mounted on said inner gear for engaging and displacing said second lever arm away from said central shaft, whereby to position said first lever arm in the path of said first pin limiting the range of said device to a number of revolutions equal to twice the number of teeth in said inner gear.

References Cited in the file of this patent

UNITED STATES PATENTS

| | | |
|---|---|---|
| 1,339,052 | Bauer | May 4, 1920 |
| 2,720,122 | Layton | Oct. 11, 1955 |